Sept. 16, 1969   L. J. RUFFNER   3,467,898
CAPACITOR WITH TERMINAL MEANS
Filed Aug. 7, 1968

INVENTOR
Lawrence J. Ruffner
BY Ralph Hammar
ATTORNEY

United States Patent Office 3,467,898
Patented Sept. 16, 1969

3,467,898
CAPACITOR WITH TERMINAL MEANS
Lawrence J. Ruffner, State College, Pa., assignor to Erie Technological Products Inc., Erie, Pa., a corporation of Pennsylvania
Filed Aug. 7, 1968, Ser. No. 750,880
Int. Cl. H01g 1/00
U.S. Cl. 317—258                                    4 Claims

ABSTRACT OF THE DISCLOSURE

A capacitor comprising a plurality of ceramic layers, each layer having an electrode coating of one face and having a terminal area at a peripheral edge of the layer. The terminal area has a coating which is an extension of the electrode coating and a perforation extending through the terminal area and intersecting the extension. The layers are stacked so that the electrode areas of adjacent layers are in register with and in contact with each other and the terminal areas of the adjacent layers are out of register and out of contact with each other. This provides space for conductive material to make contact with the surfaces of the extensions of the electrode areas to increase the current carrying capacity.

---

This invention is a sintered multi-layer ceramic capacitor in which the layers have the perforated terminal areas to one side of the electrode areas with the perforations in the terminal areas intersecting extensions of the electrodes. The layers are stacked so that the electrode areas are in register with and in contact with each other so as to be sintered into a solid block while the terminal areas of adjacent layers in the stack are out of register and out of contact with each other to provide access space for conductive material making connection between the surfaces of the electrode extensions and leads extending through the perforations.

Figure 1:
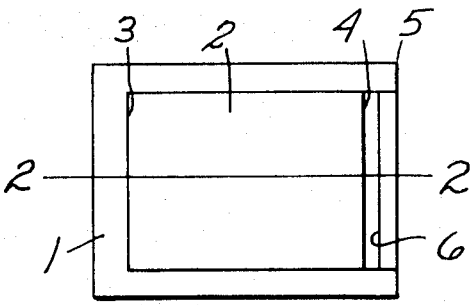
Figure 2:
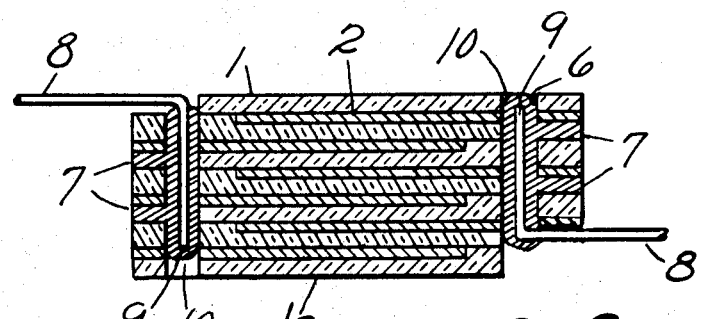
Figure 3:
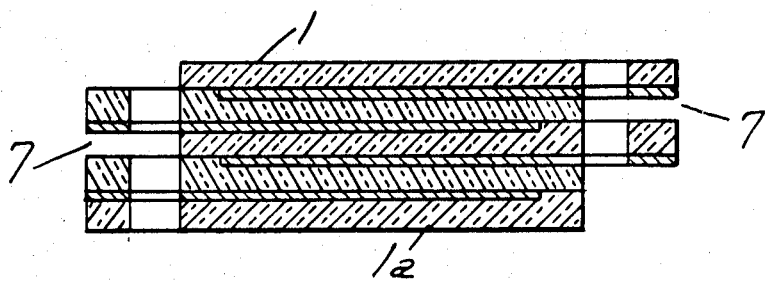

In the drawing, FIG. 1 is a plan view of a preferred form of one of the electroded ceramic layers, FIG. 2 is a section on line 2—2 through a capacitor consisting of a stack of the plurality of the FIG. 1 layers, and FIG. 3 is a section through a stack of layers before inserting and soldering the leads.

The capacitor is made from a plurality of sheets or layers 1 of green ceramic of any desired shape such as the rectangular shape shown and of thickness and material suited to the service requirements. One surface of the layer 1 has applied thereto a coating of suitable metallic paint 2 which provides an electrode coating between the area defined by lines 3 and 4 and provides a terminal area extension in the area between lines 4 and 5. The coating is applied while the ceramic is green and is of a metal which will stand the firing temperature of the ceramic. For ceramics requiring extremely high firing temperatures, the coating 2 will be of platinum paint while for ceramics having lower firing temperatures, other metals may be used. The thickness of the layers depends upon the dielectric strength of the ceramic and the operating voltage of the capacitor. Thicknesses from five to ten or more mils have been used. In the terminal area extension between lines 4 and 5 there is a rectangular perforation 6 intersecting the extension of the coating 2.

The capacitor shown in FIG. 2 comprises a plurality of layers 1 and a plain or unelectroded layer 1a. The layers 1 are stacked so that the electrode areas of adjacent layers are in registration with each other and the electrodes thereon are in capacity relation to each other while the terminal areas of adjacent layers are out of registration and out of contact with each other. For the rectangular shape of layer shown in FIG. 1 this is conveniently accomplished by turning alternate layers 1 end for end so that counting from one end of the stack odd numbered layers have terminal extensions projecting from one side of the stack while even numbered layers have terminal extensions projecting from the opposite side of the stack. This provides spaces such as shown at 7 between the terminal extensions, the spacing being theoretically equal to the thickness of one of the ceramic layers. The plain or unelectroded sheet 1a covers the electrode exposed at the bottom of the stack. After stacking the green ceramic layers, the stack is fired at ceramic firing temperatures to fuse or sinter the ceramic and to mature the metal paint coatings. At the end of the firing operation the electrode area sections of the ceramic layers are sintered or fused into a solid block while the terminal area extensions of the ceramic layers project from the block. During the firing there may be some warping or sagging of the terminal area extensions, but there will still be significant spaces between adjacent terminal extensions.

Leads 8 having hook extensions 9 extending through the perforations 6 are electrically connected to the electrodes by solder or silver paste or other conductive material 10 which fills the perforations and the spaces 7 between the terminal extensions and makes electrical contact between the capacitor electrodes and leads. While the electrical contact to the electrode portion of the coatings is edge contact, the electrical contact to the terminal lead extensions is surface contact through the conductive material in the spaces 7 which provides huge contact areas as compared to the edge or line contact with the edges of the electrode portions of the coatings. The massive conductive material 10 not only provides the low contact resistance needed for high current carrying capacity, but it also serves to provide heat conductivity. From one aspect the terminal extensions may be considered as heat dissipating fins. Another advantage of the construction is that the hook sections 9 of the leads provide great mechanical strength. The leads cannot be pulled away without breaking the ceramic.

What is claimed as new is:
1. A capacitor comprising a plurality of ceramic layers, each layer having an electrode area and a terminal area adjoining the electrode area and adjacent a peripheral edge of the layer, a metallic coating on said electrode area with an extension of the coating on the adjoining terminal area, said terminal area having a perforation extending through the layer and intersecting said extension of the electrode coating, the layers being stacked with the electrodes of adjacent layers in capacity relation to each other and with the electrode areas of adjacent layers in registration and in contact with each other and with the terminal areas of adjacent layers out of registration and out of contact with each other providing space for the terminal area perforations, and conductive material in said space and perforations joining the leads with the ex- tensions associated with the perforations through which the leads extend.

2. The capacitor of claim 1 in which each layer is rectangular and the perforation is a slot adjacent one edge of the layer.

3. The capacitor of claim 1 in which the layers are identical and adjacent layers in the stack are differently oriented.

4. The capacitor of claim 1 in which the leads have hook sections extending through the perforations.

References Cited

FOREIGN PATENTS 669,433  10/1951  Great Britain.
1,057,097  4/1954  France.

E. A. GOLDBERG, Primary Examiner

U.S. Cl. X.R.

317—261